Figure 1:
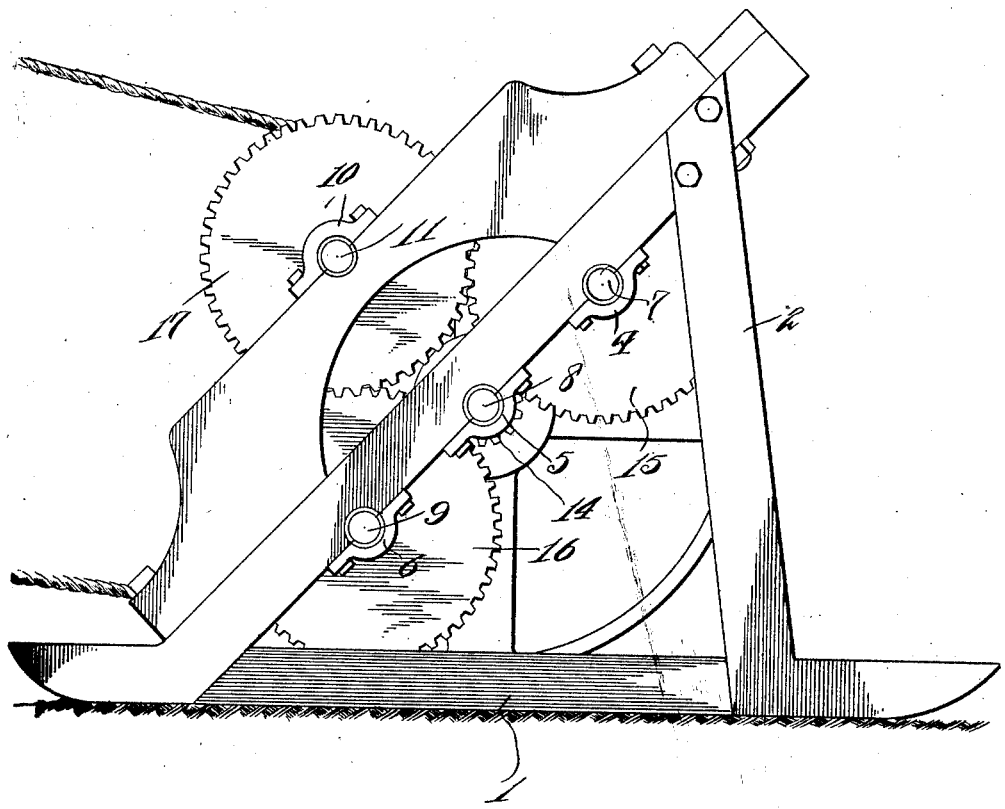

April 9, 1929.  C. GROSS  1,708,880
CABLE OPERATING MACHINE
Filed Jan. 13, 1927  3 Sheets-Sheet 1

INVENTOR
Cecil Gross.
BY
Munn&Co
ATTORNEYS

April 9, 1929.  C. GROSS  1,708,880
CABLE OPERATING MACHINE
Filed Jan. 13, 1927    3 Sheets-Sheet 2
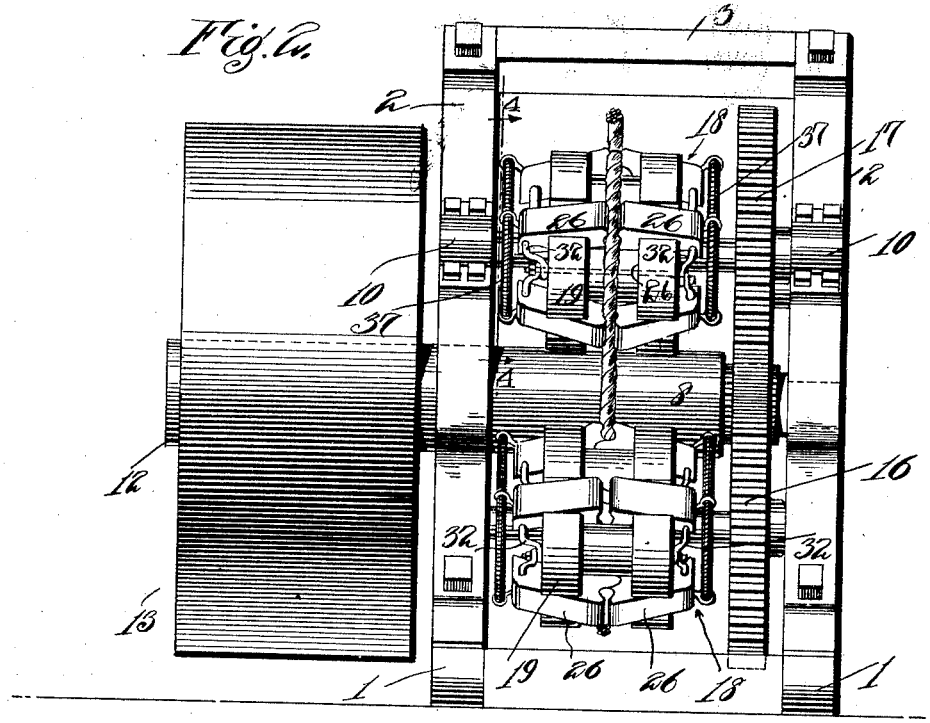
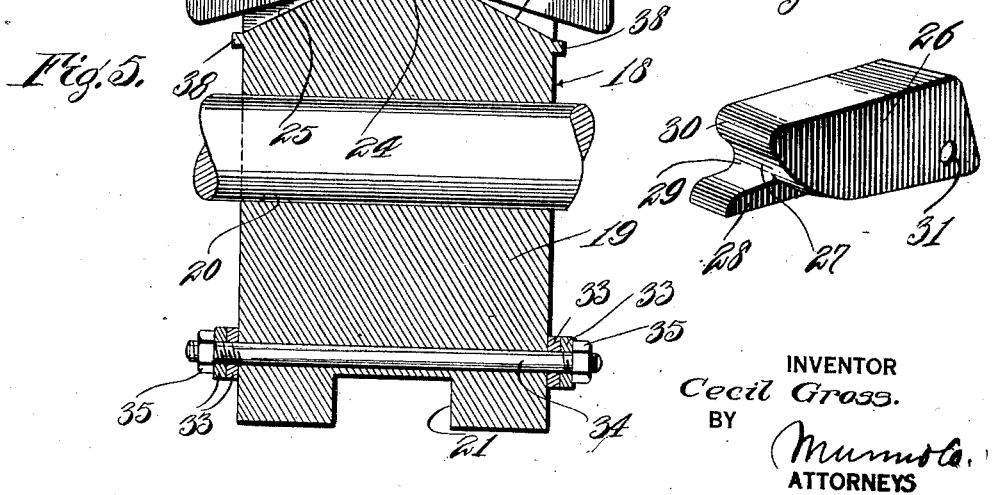
INVENTOR
Cecil Gross.
BY
ATTORNEYS

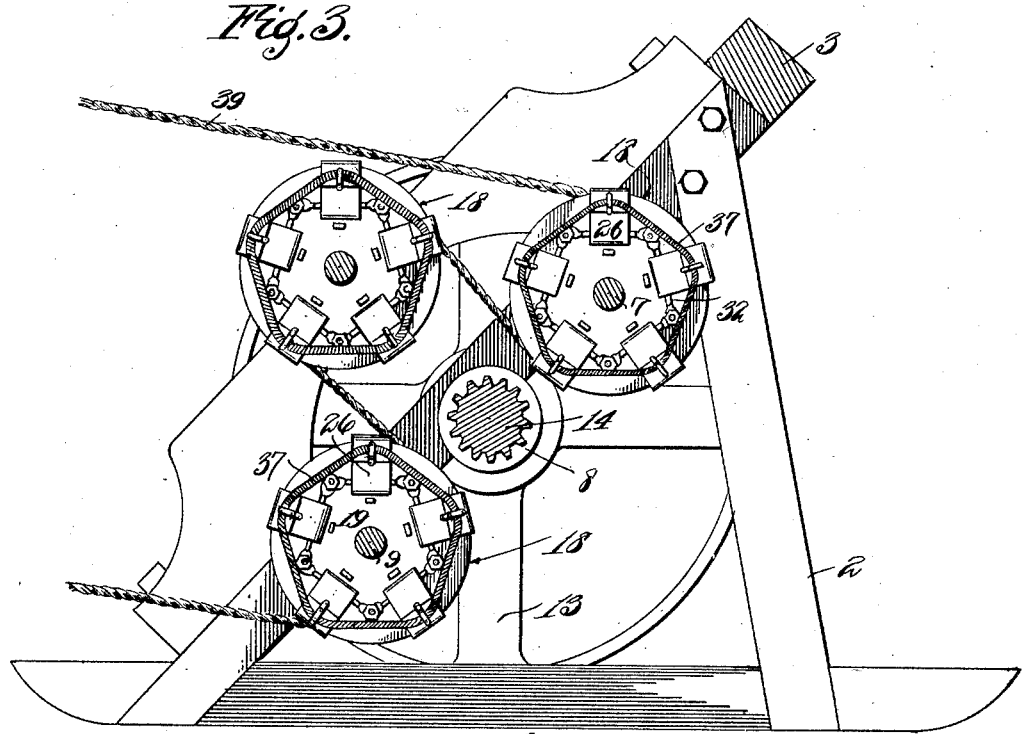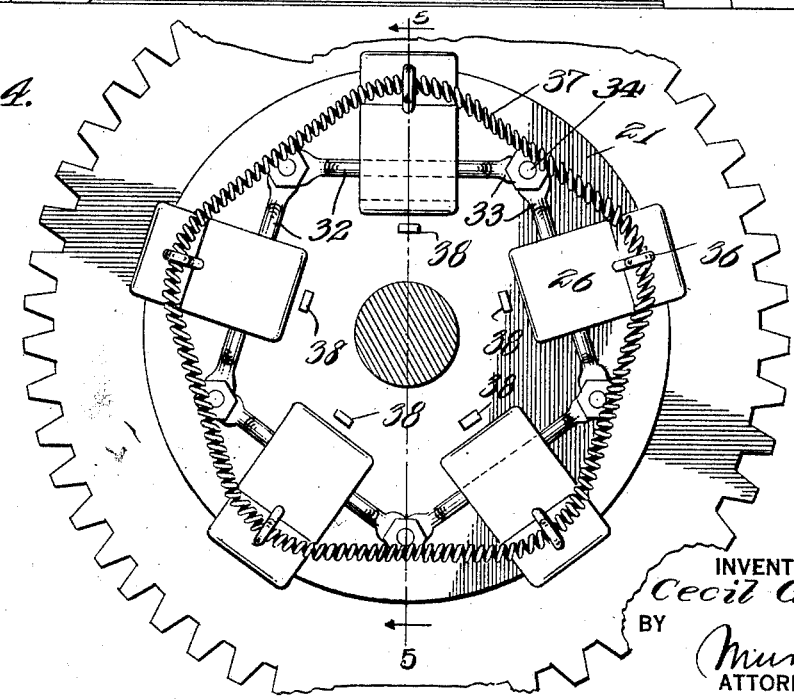

Patented Apr. 9, 1929.

1,708,880

UNITED STATES PATENT OFFICE.

CECIL GROSS, OF ELKINS, WEST VIRGINIA.

CABLE-OPERATING MACHINE.

Application filed January 13, 1927. Serial No. 160,944.

My invention relates to improvements in machines or engines for operating a cable for use in yarding logs, hoisting heavy objects, and like work, and it consists in the combinations, constructions and arrangements herein described and claimed.

An object of the invention is the provision of a machine of the character described which affords facilities for making use of a relatively small force to produce a relatively strong pull on an associated cable and for positively preventing slipping of the cable during the operation of the machine, thus obviating the use of the usual haul-back line when the machine is used for yarding logs or like work.

A further object of the invention is the provision of a machine of the character described having a set of three novel cable winding pulleys relatively arranged in respect to one another to jointly produce a relatively strong pull on an associated cable when the pulleys are actuated simultaneously and at the same time to hold the cable against slipping.

A further object of the invention is the provision in a machine of the character described of a pulley having a plurality of pairs of cooperative clamping jaws spaced around its periphery the jaws of each pair being adapted to tightly clamp or grip the associated cable therebetween as the cable is moved against said jaws toward the axial line of the pulley, and to release the cable as the portion of the periphery of the pulley on which the jaws are located moves on rotation of the pulley out of contact with the cable.

Other objects and advantages of the invention will be apparent from the following description, considered in conjunction with the accompanying drawings, in which Figure 1 is a side elevation of the improved machine, Figure 2 is a front view of the machine, Figure 3 is a longitudinal vertical section through the machine, Figure 4 is a relatively enlarged fragmentary transverse vertical section substantially along the line 4—4 of Figure 2, Figure 5 is a section substantially along the line 5—5 of Figure 4, and Figure 6 is a perspective view of one of the clamping jaws of each of the novel pulleys which are used in the machine.

The supporting structure of the machine comprises a frame having a base formed to provide a pair of runners 1 on which supporting side members 2 are upstanding and are connected with each other at their upper ends by a cross bar 3. The side members 2 of the supporting frame structure have three vertically spaced pairs of alined bearings, as at 4, 5 and 6, respectively in which the end portions of transverse shafts 7, 8, and 9, respectively, are journaled. The shafts 7, 8 and 9 are parallel with one another. The shaft 7 is located above and rearwardly of the shaft 8 and the shaft 8 is located above and rearwardly of the shaft 9. The side members of the supporting frame of the device also have alined bearings 10 for a transverse shaft 11 which is parallel with the shafts 7, 8 and 9 and is located in advance of and above the level of the shaft 8.

The shaft 8 is the drive shaft of the machine and has an end portion 12 extending laterally of one of the sides of the frame of the machine. Any suitable means for imparting a torque to the shaft 8 may be provided. For example, a belt pulley 13 may be secured to the extending end portion 12 of the shaft 8 for engaging with a belt, not shown, for transmitting motion to the pulley 13 from any convenient source of power. The major portion of the shaft 8 is relatively heavy and strong.

The shaft 8 carries a drive pinion 14 in mesh with relatively large gears 15 and 16 which respectively are secured on the shafts 7 and 9. The gears 15 and 16 are shown as being spur gears and are in mesh with a gear 17 that is secured on the shaft 11. The gears 15, 16 and 17 are equal in size with one another. With the arrangement just described, the shafts 7 and 9 will be turned in the same direction when the shaft 8 is rotated and in the direction opposite to the direction of rotation of the shaft 8 while the shafts 8 and 11 will turn in the same direction.

Each of the shafts 7, 9 and 11 carries a pulley generally indicated at 18, which is of novel construction.

Each of the pulleys 18 comprises a body 19 which is of generally circular configuration in cross section and has a central bore 20 for the reception of a shaft 7, 9 or 11. Each pulley body 19 is secured on the shaft on which it is mounted in any suitable known manner, as by means of a key, and is disposed intermediate the side members 2 of the supporting frame. Each pulley body 19 has a peripheral groove or channel 21 formed therein and also has a plurality of transverse channels 22 in its periphery, the respective channels 22 being equi-distant from one another about the circumference of the pulley body and preferably being five in number. Each transverse channel 22 intersects the circumferentially extending channel 21 at the juncture of two faces 23 of the bottom of the channel 21 and the bottom of each transverse channel 22 is formed to have a substantially flat middle portion 24 and downwardly and outwardly sloping end portions 25. A pair of clamping jaws 26 is provided for each of the transverse grooves 22. Each clamping jaw 26 has a substantially rectangular body adapted to extend through an end portion of the transverse channel 22 from one side of the pulley body into the circumferentially extending channel 21. The inner end portion of each clamping jaw 26 has a downwardly and rearwardly sloping face 27 from the lower part of which a supporting lug or lip 28 extends in a forward direction for approximately half the width of the body of the clamping jaw, thus producing the transverse groove or seat 29 at the inner end of the clamping jaw and the forwardly extending transverse bill or retaining lip 30 at the top of the inner end of the clamping jaw. The jaw portion 30 at the inner end of each clamping jaw 26 preferably is rounded off vertically and the seat 29 is concavely curved in vertical section so that no sharp edges are provided on the portions of the jaw member which come into contact with an associated cable in a manner to be presently described.

The extending outer end portion of each jaw member 26 is provided adjacent to its lower face and at a substantial distance inwardly from its outer end with a transverse opening 31 for the reception of a pivot element 32. Each pivot element 32 is shown in Figure 4 as being a rod having eye members 33 at its opposite ends for the reception of the outer end portions of transverse rods 34 which extend through the body 19 of the pulley as best seen in Figure 5. The eye members 33 at adjacent ends of adjacent rods 32 at each side of the pulley body are disposed on the adjacent end portion of the same transverse rod 34 and the end portions of the respective rods 32 are suitably offset so that the jaw supporting portions of the rods 32 will lie in the same vertical plane and at the same distance from the adjacent side of the pulley body. Nuts 35 are threadedly engaged with the end portions of the transverse rods 34 for preventing displacement of the end portions of the associated rods 32 therefrom and the nuts 35 may be tightened more or less against the associated eye members 33 of the adjacent rods 32 to adjust within limits the positions of the jaw members 26 in the end portions of the transverse grooves 22.

Screw eyes 36 are inclined upwardly and outwardly from the upper corners of the outer end portions of the jaw members 26 and thus are located laterally outward beyond the plane of the pivot members 32 on which the jaw members 26 are supported. An endless contractile spring 37 of coil formation extends through the screw eyes 36 of the respective jaw members 26 at each side of the pulley body and tends to swing the jaw members 26 in an upward and outward direction about pivot elements 32 from the positions shown in Figures 2, 4 and 5 until the outer end portions of the jaw members 26 abut the laterally extending lugs 38 on the side faces of the pulley body. At this time, the inner end portions of the jaw members 26 will have been swung upwardly and outwardly until the upper lips or bills 30 at the inner ends of the jaw members are disposed outwardly of the periphery of the pulley body and are spaced apart a distance greater than the diameter of a cable 39 that is used with the device.

It will be noted that the lower lips 28 of the jaw members 26 of each pair overlap each other in the circumferentially extending channel 21 of the pulley body as clearly shown in Figure 5.

From the foregoing description of the various parts of the device, the operation thereof may be readily understood. The device is particularly well adapted for use in yarding logs. The cable 39 is an endless cable although only the portions thereof which are engaged with the machine or adjacent thereto are shown in the drawings. The lower stretch of the cable 39 extends under the pulley 18 on the shaft 9, then forwardly and upwardly under the pulley 18 of the shaft 11 and then downwardly and rearwardly under the pulley 18 on the shaft 7 and then forwardly over the pulley 18 on the shaft 7 to produce the upper stretch of the cable. The cable moves in the circumferentially extending groove 21 of each pulley body between the upper lips or bills at the inner ends of the pairs of jaws 26. As the respective pulleys 18 of the machine are turned in the directions hereinbefore stated because of the turning of the drive shaft 8 in a given direction, the cable 39 will be drawn tightly about the pulleys and will be held against slipping by certain of the pairs of jaw members 26 of each pulley. It will be understood that as the pulleys move in contact with the cable, the pressure of the cable on the lower lips 28 of the jaw members 26 will cause the inner end portions of the jaw members 26 of each pair to swing downwardly toward the middle portion of the bottom of the transverse channel 22 in which such jaw members 26 are disposed as the cable moves toward the center of the pulley body or as the pulley turns in contact with the cable. The cable then will be partially received in the seats 29 of the jaw members 26 of each pair and will be clamped in place between such jaw members. As the cable moves away from the periphery of the pulley body or as the pulley body is turned about its axis away from the cable, the pressure of the cable on the upper lips 30 of the jaw members 26 of each pair will cause the inner end portions of such jaw members to swing upwardly and apart so as to release the cable. The cable thus will be held against slipping by certain of the pairs of jaws of each pulley and will be released by the pairs of jaw members sequentially as each pulley turns so that motion will be imparted to the cable as the pulleys are operated from a common drive shaft. The logs or articles that are to be lifted or transported may be secured by suitable clamps, not shown, or other fastening devices to one of the stretches of the endless cable and the drive shaft of the machine then is turned in the direction required to effect movement of the article supporting stretch of the cable in the desired direction. The construction of the improved pulley is such that the clamps for securing articles to the cable may remain on the cable as the cable passes around the pulleys without interference with the operation of the machine.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. In a device of the character described, a pulley comprising a substantially cylindrical body portion having a circumferentially extending groove in its periphery and a plurality of transverse grooves spaced equi-distantly about the periphery of the pulley body, pairs of clamping jaws extending from the opposite sides of the pulley body through the end portions of said transverse grooves into said circumferentially extending groove, means on the opposite sides of said pulley body for pivotally supporting said jaws, the jaw members of each pair having lapped lower lips at their inner ends and having shorter upper lips extending toward each other and spaced from the lower lips to produce transverse seats, each adapted to partially receive a cable when the jaws are closed, and circumferentially extending contractile springs engaging the outer ends of the jaws and normally urging the latter apart.

2. In a device of the character described, a pulley comprising a substantially cylindrical body having a circumferentially extending groove in its periphery and a plurality of transverse grooves spaced equi-distantly about the periphery of the pulley body, pairs of clamping jaws extending from the opposite sides of the pulley body through the end portions of said transverse grooves into said circumferentially extending groove, means from the opposite sides of said pulley body for pivotally supporting said jaws, the jaw members of each pair having lapped lower lips at their inner ends and having shorter upper lips extending toward each other and spaced from the lower lips to produce transverse seats, each adapted to partially receive a cable when the jaws are closed, and means for pivotally supporting said jaw members comprising transverse rods extending through the pulley body, side rods extending through transverse openings in the outer end portions of the jaw members and having eye members disposed on the end portions of said transverse rods, and retaining nuts in threaded engagement with the outer end portions of said transverse rods, the jaw members having outwardly and upwardly inclined screw eyes at their outer ends, and endless contractile springs extending through said screw eyes and tending to open said jaws.

3. In a device of the character described, a pulley comprising a substantially cylindrical body portion having a circumferentially extending groove in its periphery and a plurality of transverse grooves spaced equi-distantly about the periphery of the pulley body, pairs of clamping jaws extending from the opposite sides of the pulley body through the end portions of said transverse grooves into said circumferentially extending groove, means from the opposite sides of said pulley body for pivotally supporting said jaws, the jaw members of each pair having lapped lower lips at their inner ends and having shorter upper lips extending toward each other and spaced from the lower lips to produce transverse seats, each adapted to partially receive a cable when the jaws are closed, and means for pivotally supporting said jaw members comprising transverse rods extending through the pulley body, side rods extending through transverse openings in the outer end portions of the jaw members and having eye members disposed on the end portions of said transverse rods, and retaining nuts threadedly engaged with the outer end portions of said transverse rods, the jaw members having outwardly and upwardly inclined screw eyes at their outer ends, and endless contractile springs extending through said screw eyes and tending to open said jaws, and stops for limiting the swinging movements of said jaws in response to the actuation of springs.

4. In a grip pulley, a pulley element, pairs of coacting jaws extending transversely of the pulley element and pivotally supported thereon, and circular contractile springs arranged concentric to the ends of the pulley and operatively connected with the outer ends of the jaws and normally urging them to open position.

5. In a grip pulley, a pulley element, pairs of coacting jaws extending transversely of the pulley at spaced intervals thereon, laterally projecting eyes carried by the outer ends of the jaws, and contractile springs passing through the eyes and normally urging the jaws away from each other.

CECIL GROSS.